United States Patent
Duff et al.

(10) Patent No.: US 7,423,575 B2
(45) Date of Patent: *Sep. 9, 2008

(54) METHOD AND APPARATUS FOR PROTECTING PERSONNEL AND MATERIAL FROM RF-BASED THREATS USING ULTRA-WIDEBAND (UWB) TRANSMISSION

(75) Inventors: William G. Duff, Fairfax Station, VA (US); Theodore L. Harwood, II, Hollywood, MD (US); Arthur Light, Oakton, VA (US); John P. Smith, Millersville, MD (US)

(73) Assignee: Sentel Corporation, Alexandria, VA (US)

( * ) Notice: Subject to any disclaimer, the term of this patent is extended or adjusted under 35 U.S.C. 154(b) by 110 days.

This patent is subject to a terminal disclaimer.

(21) Appl. No.: 11/339,304

(22) Filed: Jan. 25, 2006

(65) Prior Publication Data

US 2008/0191924 A1    Aug. 14, 2008

Related U.S. Application Data

(63) Continuation-in-part of application No. 11/084,275, filed on Mar. 18, 2005, now Pat. No. 7,138,936.

(60) Provisional application No. 60/647,342, filed on Jan. 26, 2005, provisional application No. 60/699,821, filed on Jul. 15, 2005.

(51) Int. Cl.
*H04K 3/00* (2006.01)
*G01S 7/00* (2006.01)

(52) U.S. Cl. .................... 342/14; 342/13; 342/175; 342/195; 455/1; 89/1.11

(58) Field of Classification Search .......... 342/13–20, 342/21, 61, 68, 82–88, 89–103, 175, 192–197; 89/1.11; 455/1, 403, 422.1, 423, 425, 456.1, 455/456.4, 528; 86/50; 375/256
See application file for complete search history.

(56) References Cited

U.S. PATENT DOCUMENTS 3,728,632 A * 4/1973 Ross ..................... 375/256

(Continued)

OTHER PUBLICATIONS

Defense Advanced Research Projects Agency (DARPA)—Advanced Technology Office. "NETEX; Networking in Extreme Enviroments"; NETEX website: www.darpa.mil/ato/programs/NETEX/DT.htm.

(Continued)

*Primary Examiner*—Bernarr E Gregory
(74) *Attorney, Agent, or Firm*—Roberts Mardula & Wertheim, LLC

(57) ABSTRACT

An ultra wideband (UWB) jamming system comprises a processor, a memory, a pulse generator, one or more UWB transmitters, and one or more UWB antennas. In an exemplary embodiment of the present invention, the RF signals of a threat transmission or an RF-triggered explosive device (RTED) are evaluated and a set of interference parameters defined for the RF signal of that device. The interference parameters are predetermined to interfere with the reception or transmission of the RF signal. The interference parameters are sent to a pulse generator that drives one or more UWB transmitters to generate a signal has a statistically high probability of jamming or introducing an error in the threatening transmission.

45 Claims, 4 Drawing Sheets

U.S. PATENT DOCUMENTS

| | | | | |
|---|---|---|---|---|
| 4,121,214 | A  * | 10/1978 | Marinaccio et al. | 342/15 |
| 5,361,070 | A  * | 11/1994 | McEwan | 342/21 |
| 5,668,342 | A  * | 9/1997 | Discher | 86/50 |
| 6,112,052 | A  * | 8/2000 | Guthrie et al. | 455/1 |
| 6,195,529 | B1 * | 2/2001 | Linz et al. | 455/1 |
| 6,222,458 | B1 * | 4/2001 | Harris | 455/528 |
| 6,393,254 | B1 * | 5/2002 | Pousada Carballo et al. | 455/1 |
| 6,456,822 | B1 * | 9/2002 | Gofman et al. | 455/1 |
| 6,490,455 | B1 * | 12/2002 | Park et al. | 455/456.4 |
| 6,496,703 | B1 * | 12/2002 | da Silva | 455/456.4 |
| 6,687,506 | B1 * | 2/2004 | Girod | 455/456.4 |
| 6,870,889 | B1 * | 3/2005 | Sugiura | 455/1 |
| 7,138,936 | B2 * | 11/2006 | Duff et al. | 342/14 |
| 2002/0086635 | A1 * | 7/2002 | Tomono | 455/1 |

OTHER PUBLICATIONS

Defense Advanced Research Projects Agency (DARPA)—Advanced Technology Office. Slideshow, "What is UWB?"; NETEX website: www.darpa.mil/ato/programs/NETEX/DT.htm.

Consumer Microcircuits Limited. "Continuous Tone Controlled Squelch System 'Type 2'; A Manufactures' Guide to Features and Implementation." May 1, 1999 (Essex, England).

Robert J. Fontana, Edward A. Richley, Lance C. Beard, JoAnn Barney. "A Programmable Ultra Wideband Signal Generator for Electromagnetic Susceptibility Testing." 2003 IEEE Conference on Ultra Wideband Systems and Technologies, Nov. 2003 (Reston, VA).

* cited by examiner

METHOD AND APPARATUS FOR PROTECTING PERSONNEL AND MATERIAL FROM RF-BASED THREATS USING ULTRA-WIDEBAND (UWB) TRANSMISSION

CROSS REFERENCE TO RELATED APPLICATIONS

This application is a continuation-in-part of U.S. application Ser. No. 11/084,275, filed Mar. 18, 2005 now U.S. Pat. No. 7,138,936, which claims priority under 35 U.S.C. § 119(e) from provisional application No. 60/647,342 filed Jan. 26, 2005, and further claims priority under 35 U.S.C. § 119(e) from provisional application No. 60/699,821, filed Jul. 15, 2005. The 60/647,342, Ser. No. 11/084,275, and 60/699,821 applications are incorporated by reference herein, in their entirety, for all purposes.

BACKGROUND

Embodiments of the present invention are directed to radio frequency (RF) jamming and/or interruption. More particularly, embodiments of the present invention are directed to jamming and/or interrupting: RF switching devices used to trigger RF-triggered explosive devices (RTEDs), RF targeting devices, and hostile RF communications.

Modern war-fighters are increasingly confronting attacks from RTEDs, particularly devices that use improvised triggering mechanisms. These "booby traps" are often triggered by RF switching devices found in ordinary household items such as garage-door openers and radio-controlled (RC) toy vehicles. RFTDs can be very effective because they are difficult to detect and to counter.

During the Gulf War, coalition forces encountered significant numbers of booby traps and improvised RTEDs. Most of these devices were located in numerous bunker complexes. By way of illustration, a common improvised RTED consists of booby-trapped 5-gallon cans of napalm actuated by a RF receiving device such as a RC toy actuator or a garage door opener. Another common booby trap encountered involved daisy chaining a group of Valmara 69 antipersonnel (AP) fragmentation mines, again actuated by a RF receiver.

The proficiency of attacks in war zones has increased in frequency with many of the attacks directed toward interdicting convoys.

In response to the use of these RTEDs, field commanders began trying to protect themselves by using RF transmitters, such as toy car remote controls, to attempt to pre-detonate RTEDs. While this worked in some cases, many devices like garage-door transmitters and car alarms use rolling codes or other "protected" RF transmissions that are difficult to predict or duplicate and do not operate at the same frequencies as the RC toy controllers. This greatly increased the number of types and frequencies of the RF jammers needed to attempt to protect a vehicle or convoy.

Typically, improvised RTEDs are remotely detonated using relatively simple, readily available low-technology devices, such as garage door openers, car alarms, Remote Keyless Entry (RKE) devices, door bells, RC toy car remotes, family radio service (FRS) and general mobile radio service (GMRS) two-way radios, cellular telephones, and pagers—all of which can be used to enable radio frequency command detonation (RFCD). Therefore, this implies that observation of the target area probably requires line-of-sight (LOS) observation points in many cases. However, the adaptation of using radios, cell phones, and other similar devices has given the enemy the standoff ability to watch forces from a distance and not be compromised.

One type of RF switching devices of concern are cheap, simple, small, low power, limited range (from 10 to 200 meters) and operate in various frequency bands from HF (3-30 MHz) through UHF (300-3000 MHz). Most of these devices operate with a simple On-Off-Keying (OOK) or Frequency-Shift-Keying (FSK) modulation. They typically initiate commands based on bit streams consisting of a series of pulses from the remote keying device. For most RF switching devices and RKEs, the receiver must receive two full consecutive correct bit streams, with each bit stream lasting for tens of milliseconds. If a bit in either bit stream is not received correctly, the receiving device will not activate.

The RF characteristics for several of these devices are presented below.

Remote Keyless Entry (US/EUROPE):
315 MHz-433 MHz,
1 mW Transmit Power,
25-100 kHz Bandwidth (BW),
Range to 100 m,
Superheterodyne Receiver (Local Oscillator) Sleep/Wake Mode (To Conserve Battery Power),
Receiver needs to receive 2 full bit streams to perform intended function.
Garage Door Openers:
27 MHz-433 MHz,
1 mW Transmit Power,
25-100 kHz Bandwidth,
Range to 200 m,
Superheterodyne Receiver (Local Oscillator) on At All Times,
Receiver needs to receive 2 full bit streams to perform intended function. Cordless Phones:
800 MHz-5.8 GHz,
100 mW Transmit Power,
50 kHz-500 kHz Bandwidth,
Range to 200 m,
Superheterodyne Receiver (Local Oscillator) on at all times.

In addition, family radio service (FRS), general mobile radio service (GMRS), and cell phones may be used to send detonation signals to an RTED. The characteristics of these devices are as follows:
GMRS/FRS
462.5625 MHz-467.7125 MHz
3.0-5.0 W Transmit Power
5 kHz
Range To 5 Miles
Superheterodyne Receiver (Local Oscillator)
Continuous Tone Coded Squelch System (CTCSS)—up to 38 channels
Digitally Controlled Squelch (DCS)—up to 110 channels
On At All Times.
Public Mobile Radio (PMR)
PMR 409 (China)
409.00625 MHz-409.09375 MHz (8 Chan)
0.5 W-5 W Transmit Power
15 kHz
Range To 8 Miles
Superheterodyne Receiver (Local Oscillator)
Continuous Tone Coded Squelch System (CTCSS)—up to 38 channels
Digitally Controlled Squelch (DCS)—up to 110 channels
On At All Times
PMR 444 (Sweden)

444.00625 MHz-444.09375 MHz (8 Chan)
0.5 W-5 W Transmit Power
15 kHz
Range To 8 Miles
Superheterodyne Receiver (Local Oscillator)
Continuous Tone Coded Squelch System (CTCSS)—up to 38 channels
Digitally Controlled Squelch (DCS)—up to 110 channels
On At All Times
PMR-446 (Europe)
446.00625 MHz-446.09375 MHz (8 Chan)
0.5 W-5 W Transmit Power
15 kHz
Range To 8 Miles
Superheterodyne Receiver (Local Oscillator)\
Continuous Tone Coded Squelch System (CTCSS)—up to 38 channels
Digitally Controlled Squelch (DCS)—up to 110 channels
On At All Times
PMR-448 (Korea)
448.00625 MHz-448.09375 MHz (8 Chan)
0.5 W-5 W Transmit Power
15 kHz
Range To 8 Miles
Superheterodyne Receiver (Local Oscillator)\
Continuous Tone Coded Squelch System (CTCSS)—up to 38 channels
Digitally Controlled Squelch (DCS)—up to 110 channels
On At All Times
PMR-477 (Australia)
477.00625 MHz-477.09375 MHz (8 Chan)
0.5 W-5 W Transmit Power
15 kHz
Range To 8 Miles
Superheterodyne Receiver (Local Oscillator)\
Continuous Tone Coded Squelch System (CTCSS)—up to 38 channels
Digitally Controlled Squelch (DCS)—up to 110 channels
On At All Times
Long Range Cordless Telephones
133 MHz-400 MHz
0.5 W-30 W Transmit Power
10 kHz-500 kHz Bandwidth
Fixed Tune and Frequency Hopping
Superheterodyne Receiver (Local Oscillator)
On at all times.
Cellular Phones/Pagers.
800 MHz-5.8 GHz,
0.1 W Transmit Power,
50 kHz-500 kHz Bandwidth,
Range From 200 m to 10 Miles,
Superheterodyne Receiver (Local Oscillator),
On At All Times.

The receivers of most RF switching devices and RKEs are superheterodyne receivers consisting of an antenna, an RF Filter, an RF amplifier, a mixer, a local oscillator, an intermediate frequency (IF) filter, an IF amplifier, and the detector. There are several ways to interfere with a superheterodyne receiver. Low-level interference sources on the same or adjacent channels can cause electromagnetic interference (EMI). Also high-level out-of-band signals can saturate the RF amplifier, causing desensitization, cross-modulation, or inter-modulation products that cause EMI. These EMI interactions are antenna-induced products (i.e., the antenna is in the path from the interferer to the receiver). Another cause of EMI is high-level signals at the IF of the receiver which penetrate the body of the receiver. This interaction does not include the antenna and is commonly called "back-door" interference.

Large and expensive efforts have been undertaken by the military to address the RTED problem. However, all of the present solutions are very sophisticated, require large pieces of equipment, and are quite costly at over $500,000 per unit. A simpler, smaller, and cheaper solution would be highly desirable.

Likewise, modern war-fighters must also confront threats from a host of RF targeting systems, such as ground-based or weapon-based RADAR. Similarly, hostile RF communication in general is a threat to war-fighters. An entire electronic warfare (EW) industry has developed to address these threats with various "jammers," but again, a simpler, smaller, and cheaper solution would be highly desirable.

In other developments, Ultra-Wide Band (UWB) technology has also progressed in recent years. UWB technology has its origins in the development of time-domain (impulse response) techniques for the characterization of linear, time-invariant microwave structures. The advent of the time-domain sampling oscilloscope (Hewlett-Packard c. 1962) and the development of techniques for sub-nanosecond (baseband) pulse generation provided the requisite tools for further basic research. While there is no single definition of what constitutes a UWB transmitter, the Federal Communications Commission (FCC) uses the following definition for regulatory purposes:

"An intentional radiator that, at any point in time, has a fractional bandwidth equal to or greater than 0.20 or has a UWB bandwidth equal to or greater than 500 MHz, regardless of the fractional bandwidth. 47 CFR 15.503 (d)."

In the early 1970's, impulse or baseband techniques were applied to a large number of potential applications ranging from low cost, high-resolution radar to specialized communications systems having low probability of detection (LPD) and low probability of interference (LPI). Within the United States, much of the early work in the UWB field (prior to 1994), particularly in the area of impulse communications, was performed under classified U.S. Government programs. Since 1994, much of the work has been carried out without classification restrictions, and the development of UWB technology has greatly accelerated. Recent UWB improvements have come about in the fields of communications, radar, and localization. Numerous manufacturers have begun producing UWB chips and the cost of UWB devices has decreased. UWB chip manufacturers include Motorola's newly spun-off chip unit, Freescale Semiconductor (XtremeSpectrum), Alereon, Staccato Communications, Wisair, FOCUS Enhancements, Inc., Jazz Semiconductor, Advanced Semiconductor Manufacturing Corporation, Hua Hong NEC Electronics Co., Ltd, and Intel Corporation.

A summary of some UWB applications, for both the military and commercial markets, is presented below:
Commercial applications:
High Speed (20+Mb/s) local area networks (LANs) and wide area networks (WANs)
Altimeter/Obstacle Avoidance Radars (commercial aviation)
Collision Avoidance Sensors
RF Identification
Intelligent Transportation Systems
Intrusion Detection Radars
Precision Geolocation Systems
Industrial RF Monitoring Systems
Military/Government Applications:
Tactical Handheld & Network LPI/D Radios Non-LOS LPI/D Groundwave Communications
LPI/D Altimeter/Obstacle Avoidance Radar
RF Identification
Intrusion Detection Radars
Precision Geolocation Systems
Unmanned Aerial Vehicle (UAV)/Unmanned Ground Vehicle (UGV) Datalinks
Proximity Fuses
LPI/D Wireless Intercom Systems The major advantages and disadvantages of UWB systems both result from the wide bandwidths associated with the ultra-short pulse waveforms that are used in most implementations of UWB technology. Although these ultra-short pulses result in the potential for high data rates for communicating and high-resolution imaging for radar applications, their associated wide bandwidths result in a potential for EMI over a wide range of frequencies. It is anticipated that UWB signals will be effective in interfering with the operation of these RF switching devices and RKEs because some portion of the UWB energy will be on-tune (thereby lowest power required to induce EMI) to the respective RF switching device and RKE receivers.

The RF characteristics for UWB devices are presented below:

Wideband Controlled Spectral Content (kHz To GHz)
High Peak Power (Effective Jamming) measured in units of Watts.
Low Average Power, measured in units of less than 1 mW.
Small Size, low power and low weight.

Although it is often regarded as new technology, the basic UWB technology has been around as long as wireless. Marconi's original spark transmission and all early wireless telegraphy were UWB. The military spent years investigating the application of UWB signals for high-resolution "carrier free" radar systems. Applications for UWB may be categorized as radar, location, and data communications.

UWB systems provide a potential for improved performance compared to legacy systems for certain military radio communication and sensing systems functions. However, the UWB systems also pose a potential threat to legacy systems because of potential EMI problems. The objective of the Defense Advanced Research Projects Agency (DARPA) Networking in Extreme Environments (NETEX) program was to create a wireless networking technology for the military user that enables robust connectivity in a wide spectrum of environments and support its integration into new and emerging sensor and communication systems. The NETEX effort investigated the susceptibility of selected military communication, navigation, and radar receivers to EMI from various UWB waveforms. The results of this investigation implied that UWB devices can easily cause EMI in legacy systems. The test also defined the UWB system parameters that caused the most effective EMI. The results of these tests demonstrated that UWB can be used effectively to interfere with simple RF switching devices and RKEs.

Seventeen selected military systems were tested to determine the susceptibility of legacy receivers to the very narrow pulses (and pulse trains) of transmitters associated with UWB systems. The selected military systems provided a representative sample of communications, navigation, and radar systems that are currently used in military applications. Typical parameters that influence receiver susceptibility are the sensitivity of the receiver, the levels of the desired and interfering signal sources, frequency and modulation of the desired signal source, pulse repetition frequency (PRF) of the UWB source, receiver bandwidth and operating frequency, and threshold levels associated with any responses.

The basic approach utilized during the NETEX testing was to subject each of the selected receivers to a number of "worst case" UWB waveforms and determine the conditions that cause EMI effects in the receiver. The results of these tests defined the receiver susceptibility threshold to these waveforms when the UWB emitter was connected directly to the receive antenna port (through a variable attenuator).

DARPA conducted over 1600 individual tests for different modes (39), at fixed frequencies (65) and during frequency hopping (5), and frequency ranges between 30 MHz and 16 GHz using 7 generic UWB waveforms. These UWB signal parameters were specified relative to selected victim RF and IFs. The UWB signal levels were not limited to FCC rules.

The tested generic UWB waveforms were as follows:

TW1—Pulse Repetition Frequency (PRF), i.e., the number of times the UWB is triggered, is equal to, or a sub-harmonic of, the test frequency, i.e., the resultant target frequency generated by the UWB, with no modulation or dithering of the PRF.

TW2—PRF is equal to, or a sub-harmonic of, the test frequency with the PRF waveform dithered +/−10%.

TW3—PRF is equal to the Intermediate Frequency (IF) bandwidth of receiver under test with the PRF waveform dithered +/−1%.

TW4—PRF is equal to the IF bandwidth with PRF frequency modulated (FM)

TW5—PRF is equal to one tenth of the IF bandwidth with no modulation or dithering on PRF.

TW6—PRF is equal to ten times the IF bandwidth with no modulation or dithering on PRF.

TW7—PRF is equal to one hundredth of the IF bandwidth with no modulation or dithering on PRF.

The tests performed measured receiver sensitivity, receiver susceptibility to white noise, receiver susceptibility to a small UWB signal (where the UWB is increased until it upsets the receiver and is then decreased until the receiver reacquires the desired signal), and receiver susceptibility to a large UWB signal (where the desired signal is increased until the receiver acquires it and then decreased until the signal reception at the receiver is upset).

The test results found that the EMI impact depended on the UWB power that fell within the receiver passband. One waveform, TW7, did not cause EMI because the average power was too low. Three waveforms, TW1, TW2, and TW6, only caused EMI when the receiver was tuned to the frequency of the UWB spectral component. Three waveforms, TW3, TW4, and TW5, caused EMI at all receiver frequencies. As noted, these tests were performed to determine the susceptibility of various RF receiver (radars and communications systems) devices to UWB signals. The tests were not intended to evaluate the use of UWB signals for jamming purposes.

What would be useful would be a jamming system that defeats (i.e., thwarts detonation or causes pre-detonation) RTEDs using RF switching devices. Such a jamming system would also be portable, use relatively small power sources, and be effective against a wide range of RF switching devices. What would also be useful is a jamming system that interrupts RF targeting systems and/or communications using smaller, lower-power devices.

SUMMARY

According to embodiments of the present invention, an ultra wideband (UWB) jamming system comprises a processor, a memory, a pulse generator, one or more UWB transmitters, and one or more UWB antennas. The one embodiment, the UWB jamming system uses UWB signals to create errors in a code sequence received by an RTED receiving device before the RTED trigger signal can cause the RTED to detonate. Additionally, for certain RF Communications devices used to trigger RTEDs, the UWB jamming system can produce "break squelch", thereby causing the RTED to pre-detonate. According to embodiments of the present invention, an RTED may be improvised from components meant for other uses (artillery shells, pagers, etc.) or manufactured as a component of an RF-triggered explosive device, such as the M131 Modular Pack Mine System or MK 186 Radio Firing Device, without departing from the scope of the present invention.

In another embodiment, the UWB jamming system uses UWB signals to cause EMI in RF targeting systems such as RADARs.

It is an aspect of the invention to use UWB controlled spectral content to corrupt the RF links used by RTEDs in the kHz to GHz ranges simultaneously.

It is another aspect of the invention to use UWB controlled spectral content to block RF targeting systems in the GHz range.

It is a further aspect of the invention to utilize radiated power of UWB to provide effective jamming of the RF links used by RTEDs.

It is yet another aspect of the present invention that the UWB waveforms use the high peak power and the low average power of UWB to provide efficient jamming of the RF links used by RTEDs, resulting in smaller size and less battery power required.

It is another aspect of the invention to block the various RF links used to trigger RTEDs with a UWB device having low average power and low weight.

It is another aspect of the invention to break squelch of the various RF communications radios used to trigger RTEDs with a UWB device having low average power and low-weight, thereby causing pre-detonation of the RTEDs.

It is an aspect of the present invention to receive updated interference parameter sets via a wireless network link.

It is another aspect of the present invention to receive an assessment of the risk of the presence of an RTED at a particular location via a wireless network link and to adjust an interference parameter set based on the risk assessment for that location.

It is still another aspect of the invention to utilize commercial/military/government UWB capabilities during the period of time that the invention is not operating in a jamming mode.

It is yet another aspect of the invention to provide an RTED protection system that comprises a wideband antenna imbedded in an armored vest. The UWB signal is connected, via a transmission line (e.g., RF Coax), to the armored vest antenna which radiates an omnidirectional pattern surrounding the soldier (i.e., RF umbrella).

A further aspect of the invention is the use of fractal antenna elements in the wideband antenna that tune the UWB emissions in the frequency bands of interest.

An embodiment of the present invention provides a method of protecting personnel from RF-triggered explosive devices (RTEDs). According to embodiments of the present invention, an RTED may be improvised or manufactured without departing from the scope of the present invention.

Predetermined interference parameters are associated with an RTED transmission signal, wherein the RTED transmission signal comprises a bit stream. A UWB signal is created using the predetermined interference parameters and transmitted thereby interfering with the reception of a bit stream required by a RTED receiver to receive and/or respond to an incoming signal. In embodiments of the present invention, the transmission signal is selected from the group consisting of a garage door opener signal, a car alarm signal, a remote keyless entry device signal, a wireless door bell signal, a toy remote control signal, an FRS signal, a GMRS signal, cellular telephone ringing signal, and a pager signal. However, this is not meant as a limitation.

In another embodiment of the present invention, the interference parameters are selected from the group consisting of a rise time, a pulse width, and pulse repetition rate expressed in pulses per unit of time (PRR), sometimes also referred to as a pulse repetition frequency (PRF), expressed in Hertz (cycles per second). The pulse rate may be varied randomly over time (referred to herein as dithering) or predictably over time (referred to as introducing jitter). The pulses may also be tone modulated with amplitude modulation (AM), frequency modulation (FM), frequency shift keying (FSK) modulation, or any other suitable scheme.

In another embodiment of the present invention, UWB signal is amplified prior to transmitting the UWB signal to the RTED receiver. In still another embodiment, the UWB signal is filtered prior to amplification.

In still another embodiment of the present invention, an alternate set of predetermined interference parameters is substituted for the predetermined interference parameters. An alternate UWB signal is created using the alternate predetermined interference parameters and transmitted.

In an embodiment of the present invention, a system for protecting personnel from RF-triggered explosive devices (RTEDs) comprises a pulse generator, one or more UWB transmitters, and one or more wideband antennas. According to embodiments of the present invention, the RTED may be either a manufactured RTED or an improvised RTED. The pulse generator receives predetermined interference parameters associated with an RTED transmission signal comprising a bit stream. The pulse generator triggers a UWB transmitter with the received predetermined interference parameters. The UWB transmitter produces a UWB signal in response to a pulse generator. The UWB transmitter is connected, via a transmission line (e.g., RF Coax), to a wideband antenna which radiates the UWB signal.

In another embodiment of the present invention, the system further comprises a memory and a processor. The memory comprises a library of sets of predetermined interference parameters. The processor retrieves a set of predetermined interference parameters from the library send the set of predetermined interference parameters to the pulse generator.

In a further embodiment of the present invention, the system comprises a wideband antenna imbedded in an armored vest. The UWB transmitter is connected, via a transmission line (e.g., RF Coax) to the armored vest antenna, which radiates an omnidirectional pattern surrounding the soldier (i.e., RF umbrella). An improvement to this wideband antenna is use of fractal antenna elements that tune the UWB emissions in the frequency bands of interest.

In yet another embodiment of the present invention, the system comprises a wideband amplifier. The UWB signal from the UWB transmitter is provided to a wideband amplifier where it is amplified and provided to the wideband antenna. In embodiments of the present invention, the wideband amplifier is selected from the group consisting of a linear amplifier, a nonlinear amplifier, and a programmable amplifier wherein a linearity characteristic of the amplifier is responsive to commands from the processor. In still another embodiment of the present invention, the system comprises a filter and a wideband amplifier. The UWB signal from the UWB transmitter is provided to a filter where the filter passes a selected bandwidth of the UWB signal, and provides the selected bandwidth of the UWB signal to the wideband amplifier. This is then provided to the wideband amplifier which amplifies the selected bandwidth of the UWB signal, and provides the amplified selected bandwidth of the UWB signal to the wideband antenna. In embodiments of the present invention, the filter is selected from the group consisting of a band pass filter, a band blocking filter, and a programmable filter wherein a frequency response characteristic of the filter is responsive to commands from the processor.

In another embodiment of the invention, a system for protecting personnel and materiel from RF targeting and/or communication systems comprises a pulse generator, one or more UWB transmitters, and one or more wideband antennas. According to embodiments of the present invention, the RF targeting or communication system (hostile RF system) may be either ground or weapon-based. The pulse generator receives predetermined interference parameters associated with the hostile RF system. The pulse generator triggers a UWB transmitter with the received predetermined interference parameters. The UWB transmitter produces a UWB signal in response to a pulse generator and sends it to a wideband antenna to broadcast the UWB signal to disrupt the hostile RF system.

DETAILED DESCRIPTION

Figure 1:
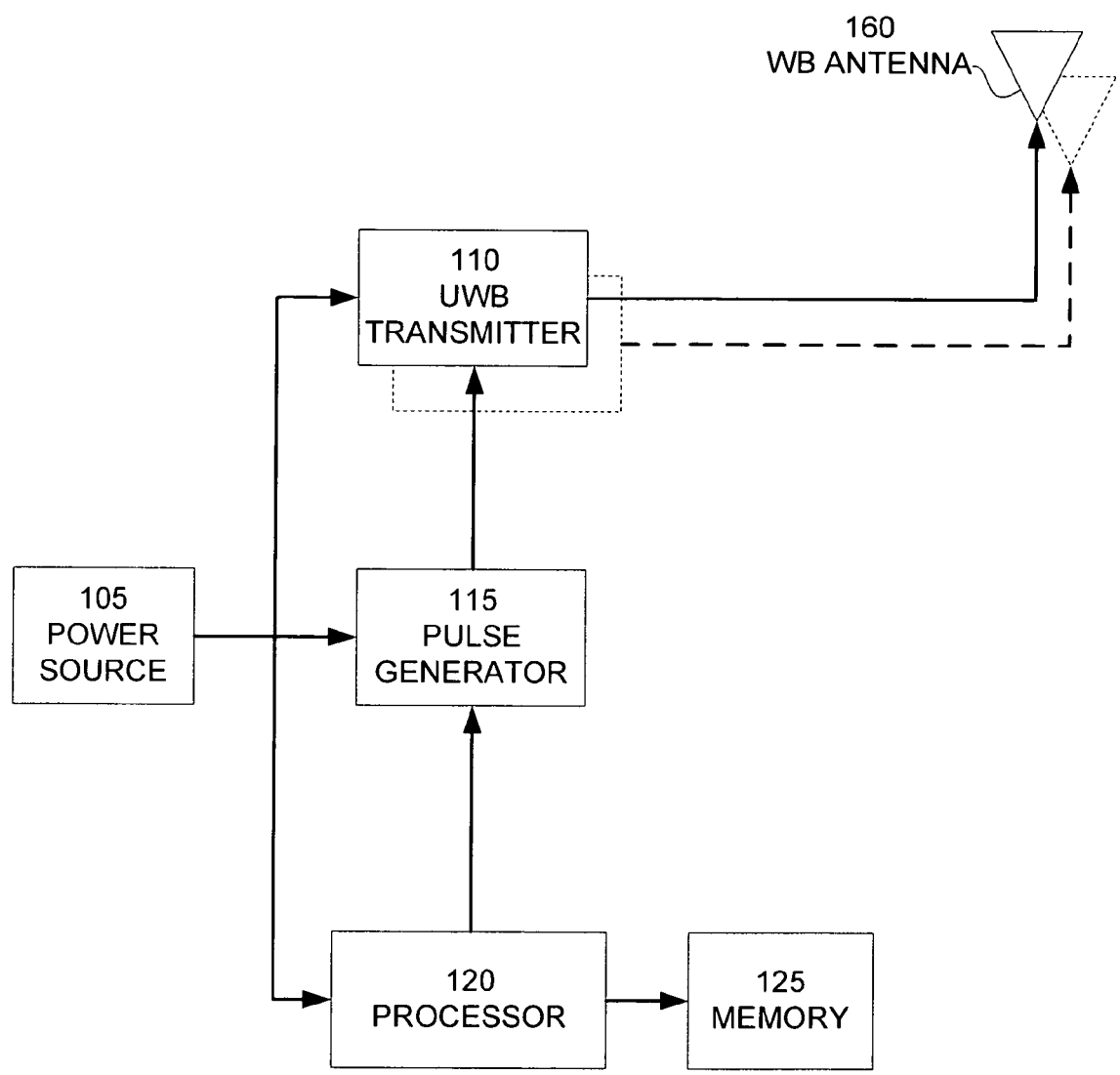
FIG. 1 illustrates a UWB jamming system according to an embodiment of the present invention.

The following terms are used in the description that follows. The definitions are provided for clarity of understanding:

| | |
|---|---|
| AM | Amplitude Modulation |
| dither- | Varying the pulse repetition rate randomly over time. |
| DTMF- | Dual Tone Multi Frequency |
| FSK- | Frequency-Shift-Keying; A form of RF signal modulation |
| FM | Frequency Modulation |
| RTED- | RF-triggered explosive device; A RTED may be manufactured or improvised. |
| jitter- | Varying the pulse repetition rate predictably over time. |
| LOS- | Line of sight. |
| OOK- | On-Off-Keying; A form of RF signal modulation. |
| PM | Pulse Modulation |
| PRR- | Pulse repetition rate. |
| PW- | Pulse width |
| RF- | Radio frequency |
| RKE- | Remote keyless entry |
| UWB- | Ultra wide bandwidth or ultra-wideband |

According to embodiments of the present invention, an ultra wideband (UWB) jamming system comprises a processor, a memory, a pulse generator, one or more UWB transmitters, and one or more UWB antennas. The UWB jamming system uses UWB signals to create errors in a code sent from an RTED triggering device to the RTED receiving device before the RTED trigger signal can cause the RTED to detonate. In an exemplary embodiment of the present invention, the RF signals of the RTED triggering device are evaluated and a set of interference parameters are defined for the RF signal of that device. The interference parameters are predetermined to interfere with the reception of the RF signal of that device by an RTED receiver.

In one embodiment of the present invention, a set of interference parameters is selected from the group consisting of a pulse rise time, a PRR, a PM, and a PW. A processor receives an interference parameter set and instructs a pulse generator to drive one or more UWB transmitters to generate a waveform meeting the interference parameters of the selected interference parameter set. The UWB signal is then broadcast via one or more UWB antennas. As a result of the selection of the interference parameters, the UWB signal has a statistically high probability of introducing an error in a code required by the RTED receiver to which the RTED detonation signal is sent to receive and/or respond to an incoming signal. The pulse rate may be varied randomly over time (referred to herein as dithering) or predictably over time (referred to as introducing jitter)

In another embodiment of the present invention, a set of predetermined interference parameters is defined for a plurality of RTED triggering devices. The interference parameter sets for the plurality of devices is stored in a memory and retrieved by the processor. The processor instructs a pulse generator to drive one or more UWB transmitters to generate a signal using the interference parameter sets for the plurality of RTED triggering devices. The UWB signal is then broadcast via one or more UWB antennas. The UWB signal has a statistically high probability of introducing an error in a code required by the RTED receivers associated with the plurality of RTED triggering devices.

FIG. 1 illustrates a UWB jamming system according to an embodiment of the present invention. Referring to in FIG. 1, UWB jamming system 100 comprises a power source 105, one or more UWB transmitters 110, a pulse generator 115, a processor 120, a memory 125, and one or more broadband antennas 160.

In an embodiment of the present invention, memory 125 comprises a library of interference parameter sets. An interference parameter set comprises parameters that define a waveform that, when transmitted by UWB jamming system 100, will interfere with a particular RTED trigger signal. In an exemplary embodiment of the present invention, the RF signals of the RTED triggering device are evaluated and a set of interference parameters are defined for the RF signal of that device. The interference parameters are predetermined to interfere with the reception of the RF signal of that device by an RTED receiver. In this embodiment of the present invention, a set of interference parameters comprises a PRR, a PW, a PM, and a pulse rise time. An interference parameter set is retrieved by processor 120 from memory 125 and sent to pulse generator 115. Pulse generator 115 controls one or more UWB transmitters 110 to produce a UWB pulse reflecting the pulse rise time, the PW, the PM, and the PRR of the selected interference parameter set. The output of the UWB transmitter 110 is sent to one or more broadband antennas 160 for transmission. In one embodiment of the present invention, the one or more UWB transmitters 110 supply a double exponential pulse.

In another embodiment of the present invention, a set of predetermined interference parameters is defined for a plurality of RTED triggering devices. The interference parameter sets for the plurality of devices is stored in memory 125 and retrieved by processor 120. The processor 120 instructs pulse generator 115 to drive one or more UWB transmitters 110 to generate a signal using the interference parameter sets for the plurality of RTED triggering devices. The UWB signal is then broadcast via one or more broadband antennas 160. The UWB signal has a statistically high probability of introducing an error in a code required by the RTED receivers associated with the plurality of RTED triggering devices to prevent the receivers to receive and/or respond to an incoming signal.

In another embodiment of the present invention, the pulse generator 115 is further adapted to vary the PRR over time by introducing a jitter or dither component into the signal sent to the one or more UWB transmitters 110. Application of dithering, modulation, and jitter to the pulse generator causes the UWB signals to be distributed more uniformly across the spectrum of interest.

Figure 2:
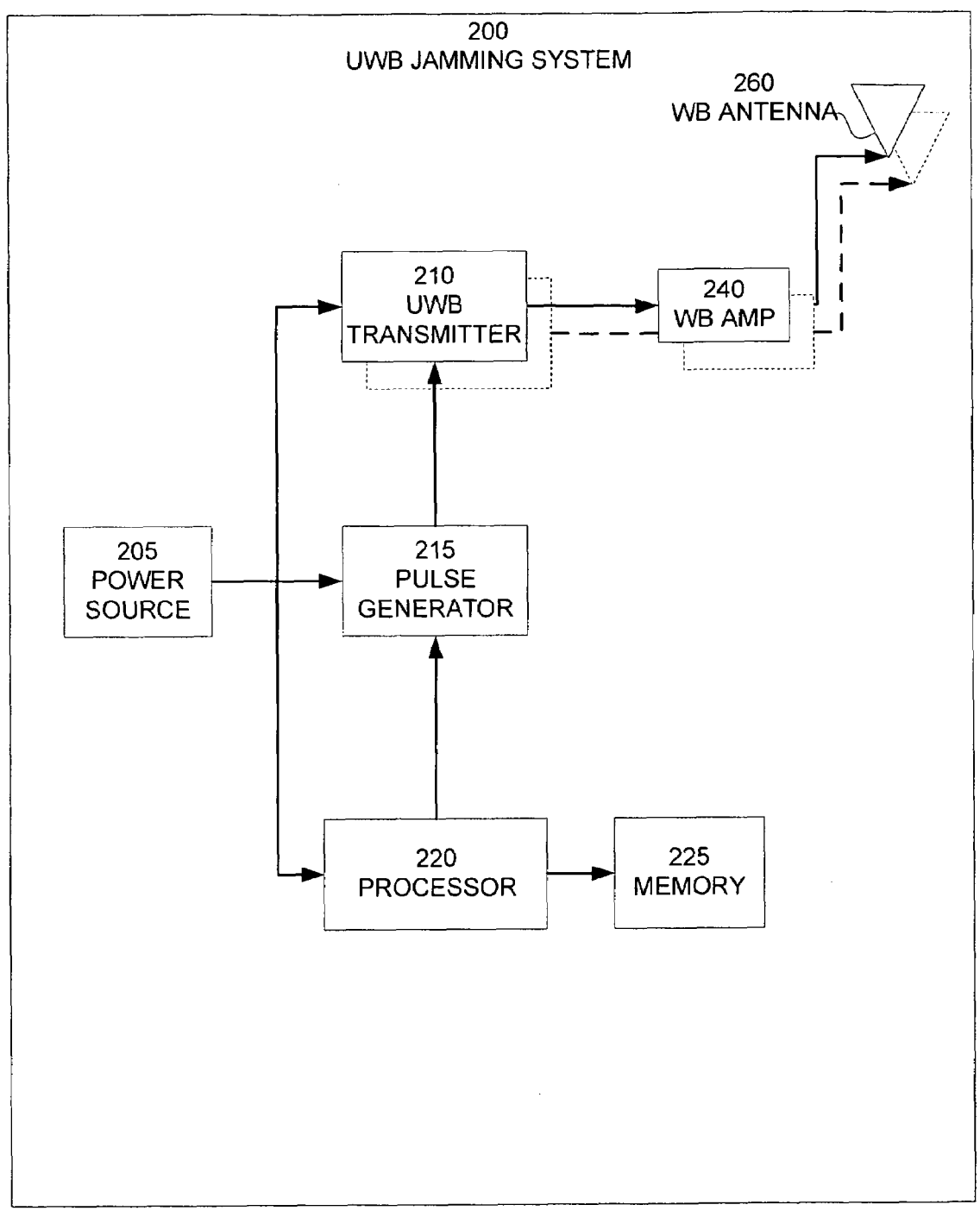
FIG. 2 illustrates a UWB jamming system utilizing a wideband amplifier according to an embodiment of the present invention.

FIG. 2 illustrates a UWB jamming system utilizing a wideband amplifier according to an embodiment of the present invention. Referring to FIG. 2, UWB jamming system 200 comprises a power source 205, one or more UWB transmitters 210, a pulse generator 215, a processor 220, a memory 225, a wideband amplifier 240, and one or more broadband antennas 260. In this embodiment of the present invention, the output of UWB transmitter 210 is further amplified to provide more power to the jamming signal.

Figure 3:
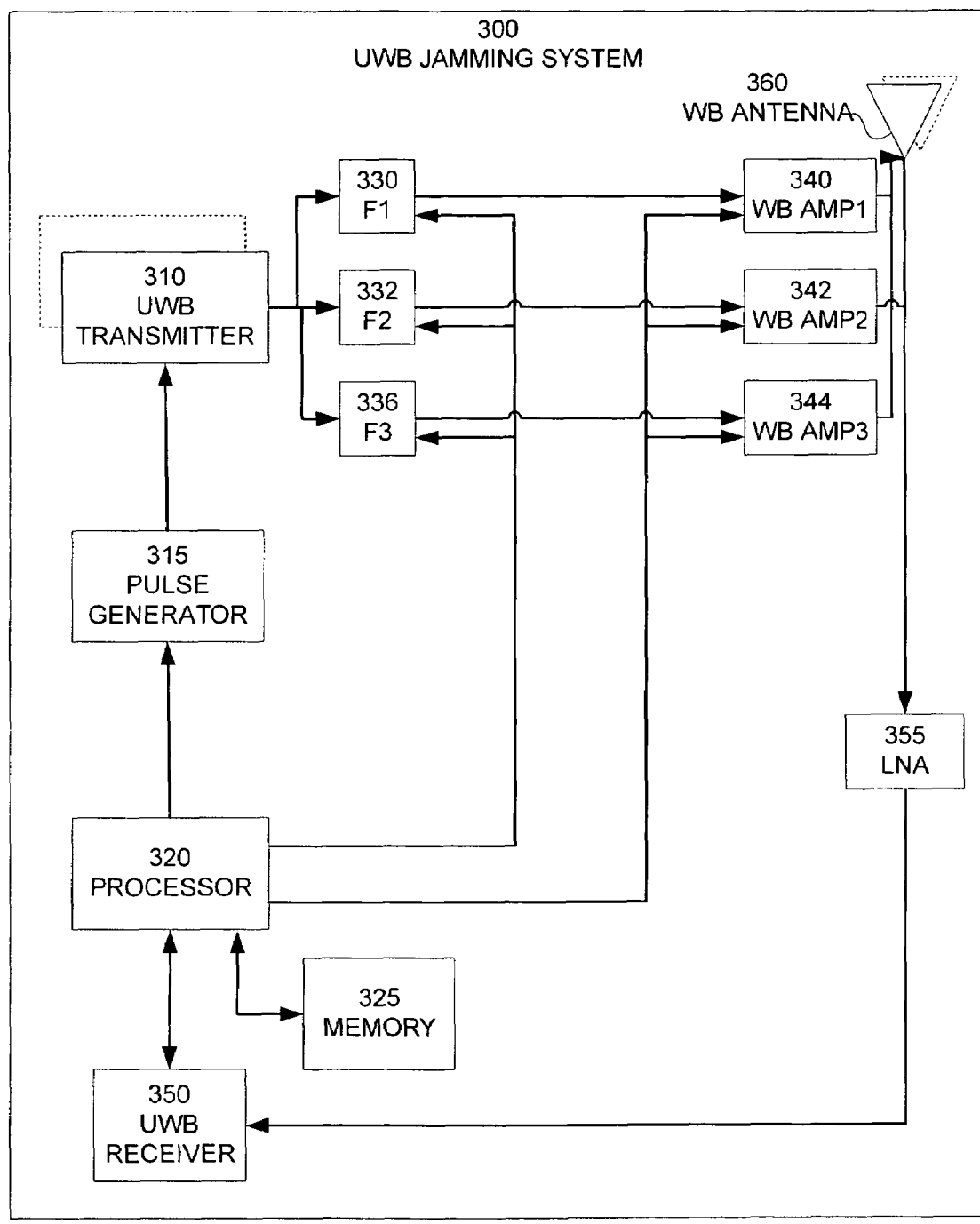
FIG. 3 illustrates a UWB jamming system utilizing a processor-controlled filters and amplifiers according to an embodiment of the present invention

FIG. 3 illustrates a UWB jamming system utilizing a processor-controlled filters and amplifiers according to an embodiment of the present invention. Referring to FIG. 3, UWB jamming system 300 comprises one or more UWB transmitters 310, a pulse generator 315, a processor 320, a memory 325, filters F1, F2, and F3 (330, 332, and 336) a wideband amplifiers WB Amp1, WB Amp2, and WB Amp3 (340, 342, and 344), and one or more broadband antennas 360. UWB jamming system 300 further comprises a power source that was not illustrated for clarity that powers UWB receiver 350, processor 320, pulse generator 315, UWB transmitter(s) 310, LNA 355, and WB amps 340, 342, and 344.

In an embodiment of the present invention, memory 325 comprises a library of interference parameter sets. An interference parameter set comprises parameters that define a waveform that, when transmitted by UWB jamming system 300, will interfere with a particular RTED trigger signal. In an exemplary embodiment of the present invention, the RF signals of the RTED triggering device are evaluated and a set of interference parameters are defined for the RF signal of that device. The interference parameters are predetermined to interfere with the reception of the RF signal of that device by an RTED receiver. In an embodiment of the present invention, a set of interference parameters comprises pulse parameters, filter parameters, and amplifier parameters. In an exemplary embodiment of the present invention, the pulse parameters comprise a PRR, a PW, a PM, and a pulse rise time; the filter parameters comprise low band, mid-band and high-band filter tuning parameters; and the amplifier parameters comprise linearity and power parameters. However, this is not meant as a limitation. As will be appreciated by those skilled in the art, other interference parameters may be used in conjunction with the elements of the UWB jamming system without departing from the scope of the present invention.

An interference parameter set is selected by processor 320 from memory 325. The processor 320 directs pulse parameters to pulse generator 315. In an exemplary embodiment of the present invention, the pulse parameters comprise a PRR, a PW, a PM, and a pulse rise time. In this exemplary embodiment, pulse generator 315 controls one or more UWB transmitters 310 to produce a UWB pulse reflecting the pulse rise time, the PW, the PM, and the PRR of the selected interference parameter set. The process continues until each set of interference parameters has been selected. In an exemplary embodiment of the present invention, the process of generating UWB pulses using the library of interference parameters held in memory 325 is completed within 30 ms, which is less than the time for an RTED triggering device to send the required bit streams to the RTED receiver. In this way, an area at risk for RTEDs may be "swept" and protected against the use of a variety of possible RTED triggering devices.

While UWB transmitter 310 is illustrated as single object, this is not meant as a limitation. In an embodiment of the present invention, UWB transmitter 310 comprises an array of UWB transmitter chips. In still another embodiment of the present invention, the UWB transmitter chips within the array produce UWB signals covering different portions of the spectrum, thereby producing a composite RF output signal at antenna 360 that is limited only by the bandwidth of antenna 360.

The RF signal from UWB transmitter 310 is fed to filters F1, F2, and F3 (330, 332, and 336) that further shape the waveform. In an embodiment of the present invention, filters F1, F2, and F3 (330, 332, and 336) are controlled by processor 320 in response to filter parameters established in the selected interference parameter set. By way of illustration and not as a limitation, the filter parameters comprise tuning parameters such that filter F1 330 comprises a blocking filter that affects a low frequency band of the UWB spectrum, filter F2 332 comprises a bandpass filter that affects a mid-frequency band of the UWB spectrum, and filter F3 336 comprises a blocking filter that affects a narrow portion of the high-frequency band of the UWB spectrum. The filter parameters, in conjunction with the waveform produced by pulse generator 315 in response to the pulse parameters, can be used to emphasize bands within the UWB spectrum so as to minimize interference with desired communication signals while maximizing the jamming effectiveness of the signal generated by the UWB jamming system 300.

The outputs of filters F1, F2, and F3 (330, 332, and 336) are fed to wideband amplifiers WB Amp1, WB Amp2, and WB Amp3 (340, 342, and 344) respectively. While three amplifiers are illustrated in FIG. 3, as will be appreciated by those skilled in the art, the number of power amplifiers may be varied without departing from the scope of the present invention.

In this embodiment, the use of multiple wideband amplifiers serves to disperse the power consumption of the amplification stage of the UWB jamming system 300 across a plurality of amplifiers. By "tuning" the amplifiers to provide non-linear amplification, the RF energy as measured by the power spectral density can be directed to the frequency bands that are most likely to interfere with the RTED trigger signal. Additionally, the peak power of the jamming signal may be controlled to provide a power level appropriate to the type of RTED trigger being used. It is anticipated that wideband amplifiers with a peak power of between 10-100 W will be desirable. As noted, the wideband amplifiers used in the present invention need not be linear, and in fact non-linearity can be beneficial in the generation of additional spurious frequencies.

The signal from filters F1, F2, and F3 (330, 332, and 336), as amplified by wideband amplifiers WB Amp1, WB Amp2, and WB Amp3 (340, 342, and 344), are combined at broadband antenna 360. In an embodiment of the present invention, broadband antenna 360 is omni-directional in the horizontal plane across a frequency range of 20 MHz to 5.4 GHz.

In an embodiment of the present invention, UWB jamming system 300 further comprises a UWB receiver 350. UWB receiver is connected to processor 320 and to broadband antenna 360 via low noise amplifier 355. In this embodiment, UWB receiver 350 receives communication signals comprising interference parameter sets and updates to existing sets, and sends these data to memory 325 via processor 320.

As will be appreciated by those skilled in the art, the a plurality of UWB jamming systems 300 may be deployed in the field and operated simultaneously to render an area safe from RTEDs. In an embodiment of the present invention, a plurality of UWB jamming systems are operated in vehicles in close proximity to each other and within the area to be jammed. The UWB jamming systems in these vehicles may be adapted to simultaneously transmit UWB signals directed to different groups of possible RTED triggering devices. In this way, a wide range of different RTED triggering devices may be effectively jammed during a specific window of time.

While a purpose of the invention is to cause EMI to jam the reception of the RF trigger signals of RTEDs, it is also desirable that the UWB signals not interfere with "friendly" signals such as Global Positioning System (GPS), radars and communications. In yet another embodiment of the present invention, UWB receiver 350 receives risk assessment data that characterizes the risk of the presence of an RTED at a particular location. The risk assessment data is used by processor 320 to select an interference parameter set that is suitable for the risk level faced by a user of UWB jamming system 300 while minimizing interference to desirable signals. By way of illustration, if a user of UWB jamming system 300 were determined to be at high risk of an RTED triggered by a cell phone, the power level of a waveform would be increased (to the possible detriment of other communications) until the risk level is reduced.

In another embodiment of the present invention, UWB receiver 350 detects the presence of RF signals within the spectrum known to be used by RTED trigger signals. Upon detection of a potential RTED trigger signal, UWB receiver 350 sends signal identifying information of the received signal to processor 320. Processor 320 compares the signal identifying information to a library of known RTED trigger signal "fingerprints" stored in memory 325. If the signal identifying information matches an RTED trigger signal "fingerprint," an interference parameter set is selected that when used to generate a UWB signal will create errors in the code sent from an RTED trigger signal to the RTED receiver thereby preventing detonation of the RTED.

In another embodiment of the present invention, the RTED trigger signal comprises a first and second bitstream. UWB receiver 350 detects the presence of RF signals within the spectrum known to be used by RTED trigger signals. Upon detection of a potential RTED trigger signal, UWB receiver 350 sends signal identifying information of the received signal to processor 320. Processor 320 compares the signal identifying information to a library of known RTED trigger signal "fingerprints" stored in memory 325. If the signal identifying information matches an RTED trigger signal "fingerprint," processor 325 selects the interference parameter set associated with the matching RTED trigger signal "fingerprints" and deduces the second bitstream from the first bitstream. The processor then modifies the RTED trigger signal "fingerprints" as necessary to transmit a UWB signal that is designed to create errors in the second bitstream sent from an RTED trigger signal to the RTED receiver thereby preventing detonation of the RTED.

In another embodiment of the present invention, UWB receiver 350 provides connectivity to a wireless network, thereby permitting UWB jamming system 300 to provide network communications when jamming of RTED trigger signals is not required.

With respect to GMRS and FRS devices, the RTED trigger signal comprises a bit stream directed to interfere with a continuous tone controlled squelch system (CTCSS) used by such devices to permit segmentation of a channel. The CTCSS transmits an inaudible tone that controls the squelch of the receiver. When the squelch is opened, a device is allowed to receive a signal. However, without the proper sub-tone, a CTCSS-enabled device will not open the squelch gate regardless of signal strength. In this environment, the RTED trigger signal comprises a bit stream directed to interfere with the delivery of sub-tones to the squelch gate, thereby preventing the receiver from operating.

With respect to cell phone devices, the RTED trigger signal comprises a bit stream that is directed to interfere with a handshaking process that occurs between the handset and a cell base station. A cell phone registers with a mobile telephone switching office (MTSO) that keeps track of the cell phone's location in a database. When a call is made to the cell phone, the MTSO looks in its database to determine which cell a cell phone is in. The MTSO also picks a frequency pair to be used to communicate with the cell phone in that cell. Without this exchange of frequency pair information, the call cannot be completed. In this environment, the RTED trigger signal comprises a bit stream directed to interfere with the delivery frequency pair information, thereby preventing the cell phone from ringing and from receiving a call.

Figure 4:
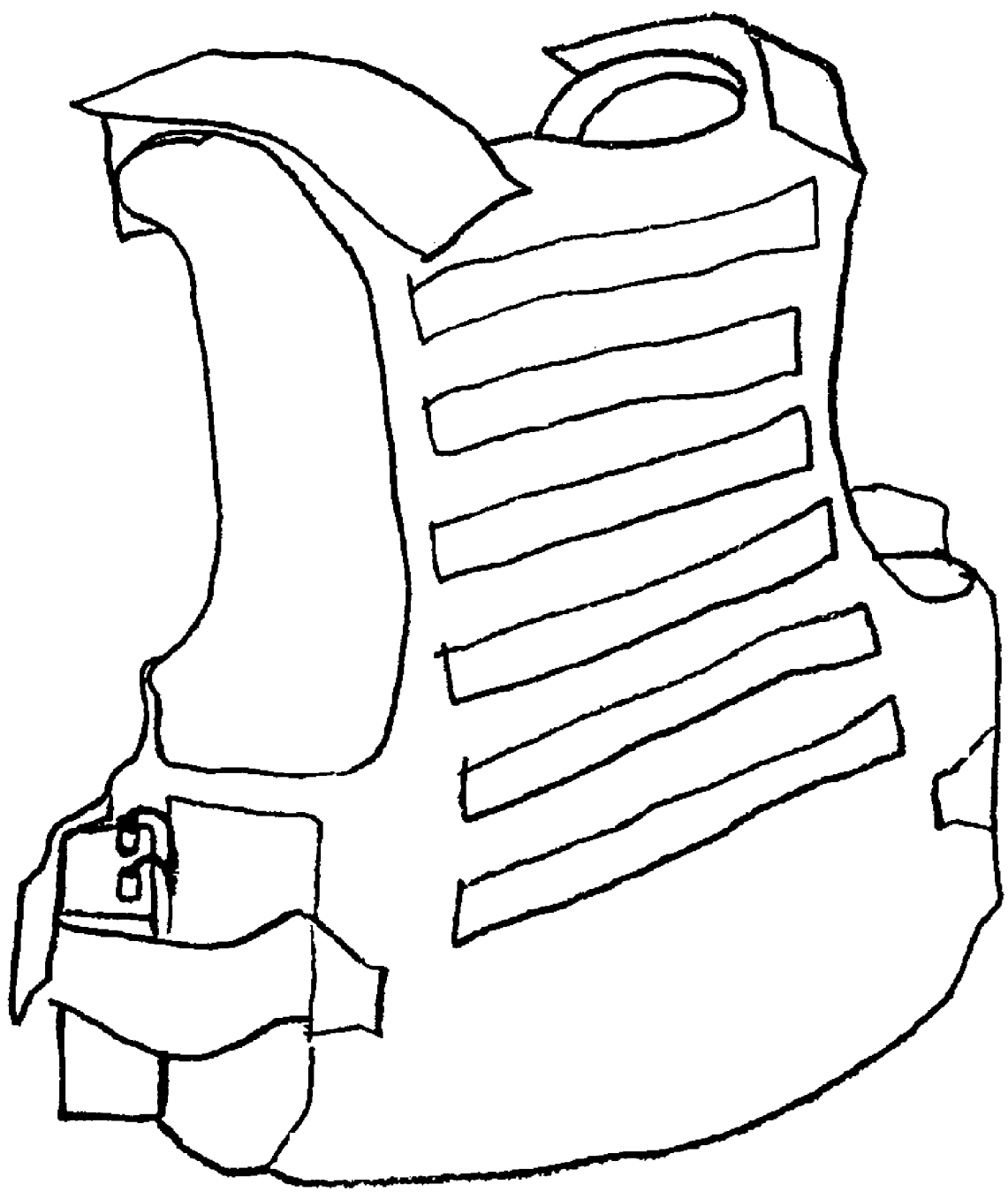
FIG. 4 illustrates a UWB jamming system utilizing a wideband antenna imbedded in an armored vest.

FIG. 4 illustrates an embodiment of the present invention in which the system comprises a wideband antenna 460 imbedded in an armored vest 400. The UWB signal from the UWB transmitter 410 is sent along a transmission line to the armored vest antenna 460, which radiates an omnidirectional pattern surrounding the soldier (i.e., RF umbrella). The additional elements of the system, including the power supply, UwB receiver, processor, memory, pulse generator, and any filters and/or amplifiers are packaged in a portable unit that is preferably carried on or attached to the vest 400 so as to be carried with the soldier.

An improvement to this wideband antenna is use of fractal antenna elements that tune the UWB emissions in the frequency bands of interest. A fractal element antenna, (FEA), is one that has been shaped in a fractal fashion, either through bending or shaping a volume, or introducing holes. They are based on fractal shapes such as the Sierpinski triangle, Mandelbrot tree, Koch curve, and Koch island. See, e.g., U.S. Pat. No. 6,452,553, the disclosure of which is incorporated by reference. The advantage of FEAs, when compared to conventional antenna designs, center around size and bandwidth. The small size of FEAs allow them to be imbedded into a small area, such as an armored vest, and yet still provide an omnidirectional pattern.

While use of the invention against RTEDs has been discussed herein primarily with respect to jamming and/or interruption of an RF signal meant to detonate the explosive device, such as by code corruption (effectively a denial of service or "DoS" attack on the RTED), the present invention also has utility for premature detonation (pre-detonation) of an explosive device at a safe standoff distance, such as by breaking squelch in systems using CTCSS. In this mode, the present invention can be used with an unmanned aerial vehicle (UAV) to sweep areas in front of convoys or blanket an area overnight to cause pre-detonation while hostile forces are setting up RTEDs.

In this pre-detonation embodiment, the signal from the library seeks to mimic the detonation signal. For example, if the RTED has the detonation set on a specific CTCSS code of a PMR unit, neutralization by premature detonation of the device is achieved by sequentially transmitting a 10 ms UWB signal mimicking each of the 38 CTCSS codes in order to break squelch and detonate the device. To neutralize the same PMR-based RTED that uses CTCSS for initiation by the DoS method, the UWB signal is chosen so that the transmission generates enough energy in-band, using a tone that is not necessarily associated with any of the 38 CTCSS tones, such that the receiver never sees the correct tone and receiver quieting occurs. To neutralize the same PMR-based RTED that uses DCS for initiation by the DoS method, the UWB signal is chosen to corrupt the DCS code word (any DCS code word is approximately 23 characters long over 131 ms). The transmission only needs to corrupt any one of these characters to cause a DoS at the device. And to neutralize the same PMR-based RTED that uses a 3 digit DTMF code for initiation by the DoS method, the UWB signals generate two tones (one associated with the vertical column and one associated with the horizontal column) such that the receiver decodes the wrong 3 digit code. As can be seen by the above examples, the UWB signals used depend, at least in part, on the victim receiver and its mode of use as well as the intended effect—DoS or pre-detonation.

As presently used against RTEDs, the UWB signals are limited only by the pulse width of the UWB generator. For example, a pulse generator capable of producing a pulse width of about 125 picoseconds limits the upper frequency of the system to about 4 GHz. Likewise, a unit with a maximum trigger rate or pulse repetition frequency of about 100 MHz (e.g., due to one or more of the capacitor recharge rates in the circuit) would limit effective UWB signals out to about 2 GHz.

While embodiments of the present invention have been discussed above with respect to defeating RTEDs, it is also contemplated that the present UWB jamming system has general EW utility against RF targeting systems such as radars and the like if configured with a suitable pulse generator. For example, a pulse generator with a 50 picosecond PW and 500 MHz pulse repetition frequency enables UWB signals up to 5.4 GHz, where the upper industrial, scientific, and medical (ISM) band is, as well as S and C military band radar. UWB jamming is limited only by the pulse width of the UWB generator. As such, extension of the UWB generator, as necessary, thus enables the present invention to disrupt radars and other communications devices—at significantly longer ranges, from 10's to 100's of kilometers.

The present invention's use of UWB allows significant miniaturization in lieu of the large Voltage Controlled Oscillators that have been traditionally used for EW.

A system and method for using UWB to block or otherwise interrupt or defeat the various RF links used in radar, communications, and the triggering RTEDs has been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. A method of protecting personnel and materiel from radio frequency (RF)-triggered explosive devices (RTEDs) comprising:
    associating predetermined interference parameters with a RTED transmission signal, wherein the RTED transmission signal comprises a bit stream;
    creating one or more ultra-wideband (UWB) signals using the predetermined interference parameters; and
    transmitting the one or more UWB signals to thereby interfere with the reception of the bit stream by a RTED receiver.

2. The method of protecting personnel and materiel from RTEDs of claim 1, wherein the RTED transmission signal is selected from the group consisting of a garage door opener signal, a car alarm signal, a remote keyless entry device signal, a wireless door bell signal, a toy remote control signal, a family radio service (FRS) signal, a general mobile radio service (GMRS) signal, cellular telephone ringing signal, and a pager signal.

3. The method of protecting personnel and materiel from RTEDs of claim 1, wherein the interference parameters are selected from the group consisting of a rise time, a pulse width, a pulse modulation, and pulse repetition rate.

4. The method of protecting personnel and materiel from RTEDs of claim 3, wherein the method further comprises varying the pulse repetition rate randomly over time.

5. The method of protecting personnel and materiel from RTEDs of claim 3, wherein the method further comprises varying the pulse repetition rate predictably over time.

6. The method of protecting personnel and materiel from RTEDs of claim 3, wherein the modulation is selected from the group consisting of Amplitude Modulation (AM), Frequency Modulation (FM), On-Off-Keying (OOK) modulation, and Frequency-Shift-Keying (FSK) modulation.

7. The method of protecting personnel and materiel from RTEDs of claim 1 further comprising amplifying the one or more UWB signals prior to transmitting the one or more UWB signals to the RTED receiver.

8. The method of protecting personnel and materiel from RTEDs of claim 7 further comprising, before amplifying the one or more UWB signals, filtering the one or more UWB signals.

9. The method of protecting personnel and materiel from RTEDs of claim 1 further comprising:
    substituting an alternate set of predetermined interference parameters for the predetermined interference parameters;
    creating one or more alternate UWB signals using the alternate predetermined interference parameters; and
    transmitting the one or more alternate UWB signals.

10. The method of protecting personnel and materiel from RTEDs of claim 1, further comprising transmitting the one or more UWB signals with one or more broadband antennas imbedded in one or more armored vest.

11. The method of protecting personnel and materiel from RTEDs of claim 1, wherein the predetermined interference parameter is selected to mimic a detonation signal and the UWB signals are transmitted at a sufficient standoff distance to neutralize the RTED by premature detonation.

12. The method of protecting personnel and materiel from RTEDs of claim 11, further comprising transmitting the one or more UWB signals from an unmanned aerial vehicle (UAV).

13. The method of protecting personnel and materiel from RTEDs of claim 1, wherein the RTED is selected from the group consisting of a manufactured RTED and an improvised RTED.

14. A system for protecting personnel and materiel from radio RF-triggered explosive devices (RTEDs) comprising:
    one or more UWB transmitters;
    a pulse generator connected to the one or more UWB transmitters;

a processor connected to the pulse generator and comprising instructions for:
  sending predetermined interference parameters associated with an RTED transmission signal to the pulse generator, wherein the RTED transmission signal comprises a bit stream;
the one or more UWB transmitters comprising means for producing one or more UWB signals in response to a the pulse generator; and
one or more wideband antennas comprising means for receiving the one or more UWB signals and broadcasting the one or more UWB signals.

15. The system of claim 14, wherein the RTED transmission signal is selected from the group consisting of a garage door opener signal, a car alarm signal, a remote keyless entry device signal, a wireless door bell signal, a toy remote control signal, a public mobile radio (PMR) signal, a family radio service (FRS) signal, a general mobile radio service (GMRS) signal, cellular telephone ringing signal, and a pager signal.

16. The system of claim 14, wherein the interference parameters are selected from the group consisting of a rise time, a pulse width, a pulse modulation and pulse repetition rate.

17. The system of claim 16, wherein the processor further comprises instructions for varying the pulse repetition rate of the pulse generator randomly over time.

18. The system of claim 16, wherein the processor further comprises instructions for varying the pulse repetition rate of the pulse generator predictably over time.

19. The system of claim 16, wherein the modulation is selected from the group consisting of Amplitude Modulation (AM), Frequency Modulation (FM), On-Off-Keying (OOK) modulation, and Frequency-Shift-Keying (FSK) modulation.

20. The system of claim 14, wherein the system further comprises:
  a memory, wherein the memory comprises a library of sets of predetermined interference parameters;
  wherein the processor comprises instructions for:
    retrieving a set of the predetermined interference parameters from the library to send to the pulse generator.

21. The system of claim 14 further comprising one or more wideband amplifier, wherein the one or more wideband amplifier comprises:
  means for receiving the one or more UWB signal from the one or more UWB transmitter;
  means for amplifying the one or more UWB signal; and
  means for providing the one or more amplified UWB signal to the one or more wideband antennas.

22. The system of claim 21, wherein the one or more wideband amplifier is selected from the group consisting of a linear amplifier, a nonlinear amplifier, and a programmable amplifier wherein a linearity characteristic of the amplifier is responsive to commands from the processor.

23. The system of claim 14 further comprising one or more filter and one or more wideband amplifier, wherein the one or more filter comprises:
  means for receiving the one or more UWB signal from the one or more UWB transmitter;
  means for passing a selected bandwidth of the one or more UWB signal; and
  means for providing the selected bandwidth of the one or more UWB signal to the one or more wideband amplifier; and
  wherein the one or more wideband amplifier comprises:
    means for receiving the selected bandwidth of the one or more UWB signal from the one or more filter;
    means for amplifying the selected bandwidth of the one or more UWB signal; and
    means for providing the amplified selected bandwidth of the one or more UWB signal to the one or more wideband antenna.

24. The system of claim 23, wherein the one or more wideband amplifier is selected from the group consisting of a linear amplifier, a nonlinear amplifier, and a programmable amplifier wherein the linearity is responsive to commands from the processor.

25. The system of claim 23, wherein the one or more filter is selected from the group consisting of a band pass filter, a band blocking filter, and a programmable filter wherein a frequency response characteristic of the filter is responsive to commands from the processor.

26. The system of claim 14, wherein the RTED is selected from the group consisting of a manufactured RTED and an improvised RTED.

27. A method of protecting personnel and materiel from radio frequency (RF)-based threats comprising:
  associating predetermined interference parameters with a transmission signal of an RF-based threat;
  creating one or more ultra-wideband (UWB) signals using the predetermined interference parameters; and
  transmitting the one or more UWB signals to thereby interfere with the transmission signal.

28. The method of protecting personnel and materiel of claim 27, wherein the transmission signal is selected from the group consisting of radar transmissions and communications transmissions.

29. The method of protecting personnel and materiel of claim 27, wherein the interference parameters are selected from the group consisting of a rise time, a pulse width, a pulse modulation, and pulse repetition rate.

30. The method of protecting personnel and materiel of claim 29, wherein the method further comprises varying the pulse repetition rate randomly over time.

31. The method of protecting personnel and materiel of claim 29, wherein the method further comprises varying the pulse repetition rate predictably over time.

32. The method of protecting personnel and materiel of claim 27 further comprising amplifying the one or more UWB signals prior to transmitting the one or more UWB signals.

33. The method of protecting personnel and materiel of claim 32 further comprising, before amplifying the one or more UWB signals, filtering the one or more UWB signals.

34. The method of protecting personnel and materiel of claim 27 further comprising:
  substituting an alternate set of predetermined interference parameters for the predetermined interference parameters;
  creating one or more alternate UWB signals using the alternate predetermined interference parameters; and
  transmitting the one or more alternate UWB signals.

35. A system for protecting personnel and materiel from radio RF-based threats comprising:
  one or more ultra-wideband (UWB) transmitters;
  a pulse generator connected to the one or more UWB transmitters;
  a processor connected to the pulse generator and comprising instructions for:
    sending predetermined interference parameters associated with a transmission signal of an RF-based threat to the pulse generator; and the one or more UWB transmitters comprising instructions for producing one or more UWB signals in response to a the pulse generator; and one or more wideband antennas comprising means for receiving the one or more UWB signals and broadcast the one or more UWB signals to interfere with the transmission signal.

36. The system of claim 35, wherein the transmission signal is selected from the group consisting of radar transmissions and communications transmissions.

37. The system of claim 35, wherein the interference parameters are selected from the group consisting of a rise time, a pulse width, a pulse modulation and pulse repetition rate.

38. The system of claim 37, wherein the processor further comprises instructions for varying the pulse repetition rate of the pulse generator randomly over time.

39. The system of claim 37, wherein the processor further comprises instructions for varying the pulse repetition rate of the pulse generator predictably over time.

40. The system of claim 35, wherein the system further comprises:

a memory, wherein the memory comprises a library of sets of predetermined interference parameters;

wherein the processor comprises instructions for:
retrieving a set of the predetermined interference parameters from the library to send to the pulse generator.

41. The system of claim 35 further comprising one or more wideband amplifier, wherein the one or more wideband amplifier comprises:

means for receiving the one or more UWB signal from the one or more UWB transmitter;

means for amplifying the one or more UWB signal; and means for providing the one or more amplified UWB signal to the one or more wideband antennas.

42. The system of claim 41, wherein the one or more wideband amplifier is selected from the group consisting of a linear amplifier, a nonlinear amplifier, and a programmable amplifier wherein a linearity characteristic of the amplifier is responsive to commands from the processor.

43. The system of claim 35 further comprising one or more filter and one or more wideband amplifier, wherein the one or more comprises:

means for receiving the one or more UWB signal from the one or more UWB transmitter;

means for passing a selected bandwidth of the one or more UWB signal; and means for providing the selected bandwidth of the one or more UWB signal to the one or more wideband amplifier; and wherein the one or more wideband amplifier comprises:

means for receiving the selected bandwidth of the one or more UWB signal from the one or more filter;

means for amplifying the selected bandwidth of the one or more UWB signal; and means for providing the amplified selected bandwidth of the one or more UWB signal to the one or more wideband antenna.

44. The system of claim 43, wherein the one or more wideband amplifier is selected from the group consisting of a linear amplifier, a nonlinear amplifier, and a programmable amplifier wherein the linearity is responsive to commands from the processor.

45. The system of claim 43, wherein the one or more filter is selected from the group consisting of a band pass filter, a band blocking filter, and a programmable filter wherein a frequency response characteristic of the filter is responsive to commands from the processor.

* * * * *